(12) United States Patent
Nishida et al.

(10) Patent No.: US 9,796,294 B2
(45) Date of Patent: Oct. 24, 2017

(54) VEHICLE DRIVEN BY ELECTRIC MOTOR AND CONTROL METHOD FOR VEHICLE

(71) Applicant: TOYOTA JIDOSHA KABUSHIKI KAISHA, Toyota-shi, Aichi-ken (JP)

(72) Inventors: Yusuke Nishida, Toyota (JP); Kenji Umayahara, Miyoshi (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 38 days.

(21) Appl. No.: 14/940,296

(22) Filed: Nov. 13, 2015

(65) Prior Publication Data

US 2016/0137100 A1 May 19, 2016

(51) Int. Cl.
*B60L 15/20* (2006.01)
*B60L 11/18* (2006.01)
*B60K 1/04* (2006.01)

(52) U.S. Cl.
CPC ............... *B60L 15/20* (2013.01); *B60K 1/04* (2013.01); *B60L 11/18* (2013.01);
(Continued)

(58) Field of Classification Search
CPC ........ B60K 1/04; B60L 11/18; B60L 11/1887; B60L 15/20; B60L 2210/12; B60L 2210/14; B60L 2240/423; B60L 2250/26; B60L 2250/28; B60W 2520/28; B60W 2540/10; B60W 2710/083; Y02T 10/645; Y02T 10/7275
See application file for complete search history.

(56) References Cited

U.S. PATENT DOCUMENTS

2010/0082189 A1* 4/2010 Xu .................. B60L 15/20
701/22
2010/0222950 A1* 9/2010 Ueoka .............. B60K 6/365
701/22
(Continued)

FOREIGN PATENT DOCUMENTS

JP 2005-93120 4/2005
JP 2009-301739 12/2009
(Continued)

*Primary Examiner* — Dale Moyer
(74) *Attorney, Agent, or Firm* — Finnegan, Henderson, Farabow, Garrett & Dunner, LLP (57) ABSTRACT

A vehicle driven by an electric motor, includes: an accelerator operation amount detection unit that detects an accelerator operation amount; a speed detection unit that detects a vehicle speed; and a control unit configured to calculate a required torque of the electric motor on a basis of the accelerator operation amount and the vehicle speed, calculate a torque increase rate, which is a required rate at which an effective torque for driving the electric motor is increased, on a basis of the required torque, and control the electric motor on a basis of the calculated torque increase rate. The control unit is configured to control the electric motor to operate at a predetermined torque increase rate until the effective torque reaches a predetermined threshold torque, and to reduce the torque increase rate below the predetermined torque increase rate after the effective torque reaches the predetermined threshold torque.

5 Claims, 4 Drawing Sheets

(52) U.S. Cl.
CPC ....... *B60L 11/1887* (2013.01); *B60L 2210/12* (2013.01); *B60L 2210/14* (2013.01); *B60L 2240/423* (2013.01); *B60L 2250/26* (2013.01); *B60L 2250/28* (2013.01); *Y02T 10/645* (2013.01); *Y02T 10/7225* (2013.01); *Y02T 10/7233* (2013.01); *Y02T 10/7275* (2013.01); *Y02T 90/34* (2013.01)

(56) References Cited

U.S. PATENT DOCUMENTS

| | | |
|---|---|---|
| 2011/0076584 A1 | 3/2011 | Katano |
| 2012/0095637 A1 | 4/2012 | Katano |
| 2012/0109444 A1 | 5/2012 | Umayahara |
| 2012/0232735 A1 | 9/2012 | Hashizaka et al. |
| 2013/0124024 A1 | 5/2013 | Nakamura et al. |
| 2014/0288758 A1 | 9/2014 | Suzuki et al. |

FOREIGN PATENT DOCUMENTS

| | | |
|---|---|---|
| JP | 2011-3278 | 1/2011 |
| JP | 2012-186940 A | 9/2012 |
| JP | 2013-121231 A | 6/2013 |
| JP | 5516081 B2 | 4/2014 |
| WO | WO 2011/004488 A1 | 1/2011 |

\* cited by examiner

VEHICLE DRIVEN BY ELECTRIC MOTOR AND CONTROL METHOD FOR VEHICLE

INCORPORATION BY REFERENCE

The disclosure of Japanese Patent Application No. 2014-231649 filed on Nov. 14, 2014 including the specification, drawings and abstract is incorporated herein by reference in its entirety.

BACKGROUND OF THE INVENTION

1. Field of the Invention

The invention relates to a vehicle that is driven by an electric motor, and a method of controlling the vehicle.

2. Description of Related Art

Vehicles that are driven by an electric motor, such as fuel cell vehicles and electric vehicles, are available in the related art (Japanese Patent Application Publication No. 2011-003278 (JP 2011-003278 A)). In these vehicles, a required torque of the electric motor is calculated in accordance with an accelerator depression amount, whereupon the electric motor is controlled such that an effective torque of the electric motor approaches the required torque.

In a typical torque characteristic of an electric motor, however, a torque output response is higher than that of an internal combustion engine, and therefore a rate at which the effective torque increases relative to the accelerator depression amount is high from a low speed. Hence, when a driver depresses an accelerator pedal at a low speed, a sensation of the vehicle shooting forward against the will of the driver may be generated. When the rate at which the effective torque increases relative to the accelerator depression amount is set to be small at all times, on the other hand, an acceleration feeling relative to the accelerator depression amount may deteriorate. As a result, there remains room for improvement in a method of determining the rate at which the effective torque increases relative to the accelerator depression amount.

SUMMARY OF THE INVENTION

The invention provides a vehicle in which a rate at which an effective torque of an electric motor increases relative to an accelerator operation amount can be set appropriately, and a method of controlling the vehicle.

According to a first aspect of the invention, a vehicle driven by an electric motor, includes: an accelerator operation amount detection unit that detects an accelerator operation amount of the vehicle; a speed detection unit that detects a vehicle speed of the vehicle; and a control unit configured to calculate a required torque of the electric motor on a basis of the accelerator operation amount and the vehicle speed, calculate a torque increase rate, which is a required rate at which an effective torque for driving the electric motor is increased, on a basis of the required torque, and control the electric motor on a basis of the calculated torque increase rate. The control unit is configured to control the electric motor to operate at a predetermined torque increase rate until the effective torque reaches a predetermined threshold torque, and to reduce the torque increase rate below the predetermined torque increase rate after the effective torque reaches the predetermined threshold torque. According to this configuration, a sufficient torque response is secured when an accelerator operation is started from a stationary condition, for example, and therefore a sensation of sluggishness at the start of the accelerator operation can be suppressed. When the effective torque exceeds the threshold torque, on the other hand, the torque increase rate is reduced, and therefore a sensation of the vehicle shooting forward against the will of a driver can be suppressed.

In the aspect described above, the control unit may include a first map showing a correspondence relationship between the accelerator operation amount, the vehicle speed, and an upper limit value of the torque increase rate, and the control unit may be configured to control the electric motor such that, when the effective torque exceeds the threshold torque and the torque increase rate exceeds the upper limit value, the torque increase rate is reduced to the upper limit value. According to this configuration, the upper limit value of the torque increase rate can be set easily in accordance with the accelerator operation amount and the vehicle speed using the first map. On the first map, for example, the upper limit value of the torque increase rate may be reduced when the vehicle speed is low and the accelerator operation amount is small, and increased steadily as the accelerator operation amount increases. In this case, the sensation of the vehicle shooting forward against the will of the driver when an accelerator operation is performed at a low speed can be suppressed easily. Meanwhile, deterioration of an acceleration feeling relative to the accelerator operation amount when a large accelerator operation is performed can be suppressed. Furthermore, according to this configuration, the upper limit value of the torque increase rate at which the driver feels most comfortable can be set easily for each vehicle speed, for example. As a result, an improvement in drivability can be achieved.

In the configuration described above, the control unit may include a second map showing a correspondence relationship between the vehicle speed and the threshold torque, and the second map may be set such that a value of the threshold torque when the vehicle speed is relatively high equals or exceeds a value of the threshold torque when the vehicle speed is relatively low. According to this configuration, the threshold torque is set to increase as the vehicle speed increases. Hence, the torque increase rate can exceed the set upper limit value at each vehicle speed until the effective torque reaches the threshold torque, and therefore the acceleration feeling of the vehicle can be improved. As a result, a sufficient torque response is secured when an accelerator operation is started from a stationary condition, for example, whereby a sensation of sluggishness at the start of the accelerator operation can be suppressed. Meanwhile, when the effective torque exceeds the threshold torque, the torque increase rate is reduced to the set upper limit value, and therefore the sensation of the vehicle shooting forward against the will of the driver can be suppressed.

In the configuration described above, the first map may be set such that the upper limit value when the accelerator operation amount is relatively large equals or exceeds the upper limit value when the accelerator operation amount is relatively small. According to this configuration, deterioration of the acceleration feeling relative to the acceleration operation amount when a large accelerator operation is performed can be suppressed.

In the configuration described above, the first map may be set such that while the accelerator operation amount is equal to or smaller than a threshold operation amount, the upper limit value when the vehicle speed is no lower than a first threshold vehicle speed and no higher than a second threshold vehicle speed is smaller than the upper limit value when the vehicle speed is lower than the first threshold vehicle speed and higher than the second threshold vehicle speed. According to this configuration, the upper limit value of the torque increase rate is relatively high when an accelerator operation is started from a stationary condition, and therefore a sufficient torque response can be secured when an accelerator operation is started from a stationary condition. As a result, a sensation of sluggishness at the start of the accelerator operation can be suppressed. Meanwhile, the upper limit value of the torque increase rate is relatively low at a low vehicle speed and a small accelerator depression amount, and therefore the sensation of the vehicle shooting forward against the will of the driver can be suppressed. Moreover, the upper limit value of the torque increase rate is relatively high at a high vehicle speed, and therefore deterioration of the acceleration feeling relative to the accelerator operation amount when an accelerator operation is performed can be suppressed.

According to a second aspect of the invention, a control method for a vehicle that is driven by an electric motor, includes: detecting an accelerator operation amount and a vehicle speed of the vehicle; calculating a required torque of the electric motor on a basis of the accelerator operation amount and the vehicle speed; calculating a torque increase rate, which is a required rate at which an effective torque for driving the electric motor is increased, on a basis of the required torque; controlling the electric motor on a basis of the calculated torque increase rate. The electric motor is controlled to operate at a predetermined torque increase rate until the effective torque reaches a predetermined threshold torque, and the electric motor is controlled such that the torque increase rate is reduced below the predetermined torque increase rate after the effective torque reaches the predetermined threshold torque. According to this configuration, a sufficient torque response is secured when an accelerator operation is started from a stationary condition, for example, and therefore a sensation of sluggishness at the start of the accelerator operation can be suppressed. When the effective torque exceeds the threshold torque, on the other hand, the torque increase rate is reduced, and therefore a sensation of the vehicle shooting forward against the will of a driver can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
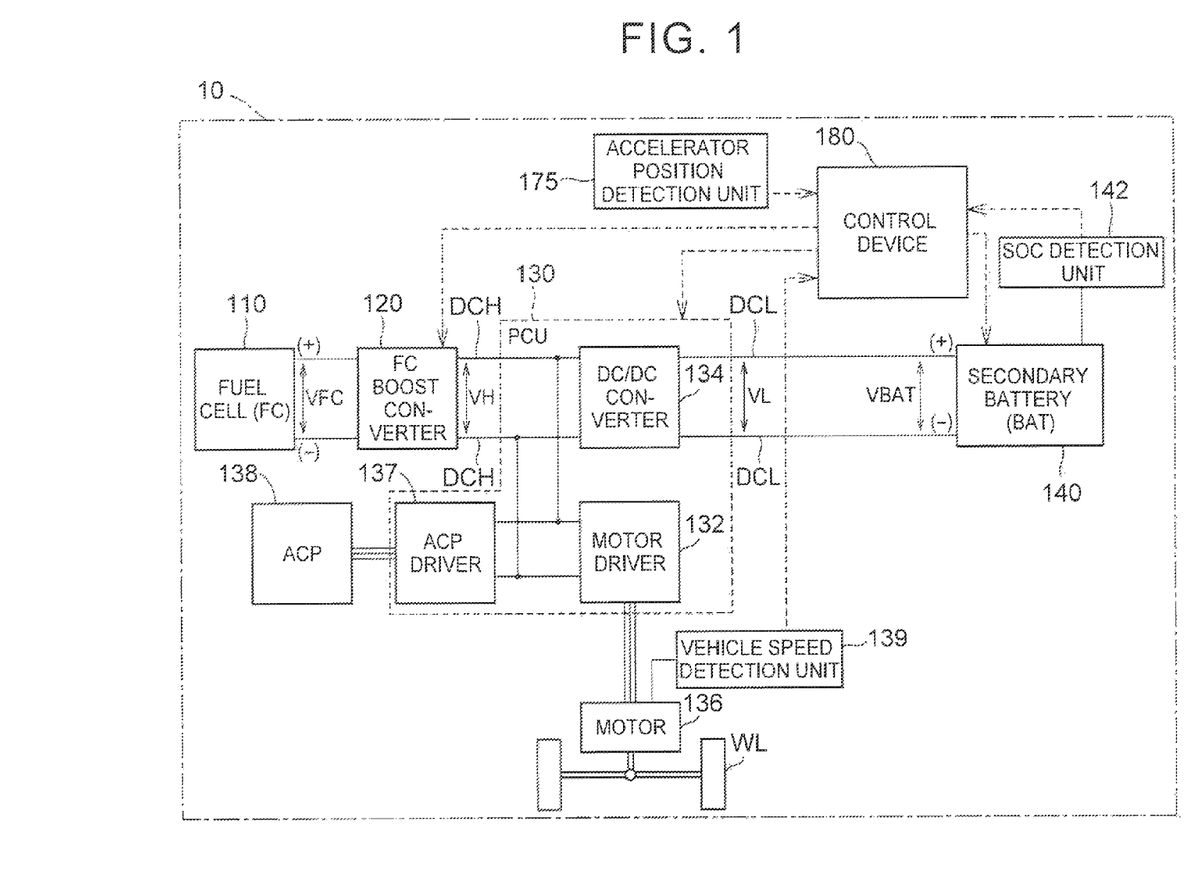
FIG. 1 is a schematic view showing a configuration of a fuel cell vehicle according to a first embodiment.

FIG. 1 is a schematic view showing a configuration of a fuel cell vehicle 10 according to a first embodiment. The fuel cell vehicle 10 includes a fuel cell 110, a fuel cell (FC) boost converter 120, a power control unit (PCU) 130, a traction motor 136, an air compressor (ACP) 138, a vehicle speed detection unit 139, a secondary battery 140, a state of charge (SOC) detection unit 142, an accelerator position detection unit 175, a control device 180, and a vehicle wheel WL. The fuel cell vehicle 10 travels when the traction motor 136 is driven by power supplied from the fuel cell 110 and the secondary battery 140.

The fuel cell 110 is a polymer electrolyte fuel cell that generates power upon reception of supplies of hydrogen and oxygen as reaction gases. Note that the fuel cell 110 is not limited to a polymer electrolyte fuel cell, and another type of fuel cell may be used. The fuel cell 110 is connected to high pressure direct current wiring DCH via the FC boost converter 120, and connected to a motor driver 132 and an ACP driver 137 included in the PCU 130 via the high pressure direct current wiring DCH. The FC boost converter 120 boosts an output voltage VFC of the fuel cell 110 to a high-pressure voltage VH that can be used by the motor driver 132 and the ACP driver 137.

The motor driver 132 is constituted by a three-phase inverter circuit, and connected to the traction motor 136. The motor driver 132 converts output power from the fuel cell 110, supplied via the FC boost converter 120, and output power from the secondary battery 140, supplied via a DC/DC converter 134, into three-phase alternating current power, and supplies the three-phase alternating current power to the traction motor 136. The traction motor 136 is constituted by a synchronous motor including a three-phase coil, and drives the vehicle wheel WL via a gear and so on. Further, during a braking operation in the fuel cell vehicle 10, the traction motor 136 functions as a power generator that generates regenerative power by regenerating kinetic energy produced by the fuel cell vehicle 10. The vehicle speed detection unit 139 detects a vehicle speed $S_{VHCL}$ (kin/h) of the fuel cell vehicle 10 and transmits the detected vehicle speed $S_{VHCL}$ to the control device 180.

The DC/DC converter 134 switches the secondary battery 140 between a charging condition and a discharging condition by adjusting a voltage level of the high pressure direct current wiring DCH in response to a drive signal from the control device 180. Note that when regenerative power is generated by the traction motor 136, the regenerative power is converted into direct current power by the motor driver 132 and charged to the secondary battery 140 via the DC/DC converter 134.

The ACP driver 137 is constituted by a three-phase inverter circuit, and connected to an ACP 138. The ACP driver 137 converts the output power from the fuel cell 110, supplied via the FC boost converter 120, and the output power from the secondary battery 140, supplied via the DC/DC converter 134, into three-phase alternating current power, and supplies the three-phase alternating current power to the ACP 138. The ACP 138 is constituted by a synchronous motor including a three-phase coil, and supplies the fuel cell 110 with oxygen (air) used during power generation by driving a motor in accordance with the supplied power.

The secondary battery 140 is a electricity storage device that stores electric energy and can be charged and discharged repeatedly. The secondary battery 140 may be constituted by a lithium ion battery, for example. Note that another type of battery, such as a lead storage battery, a nickel cadmium battery, or a nickel hydrogen battery, may be used as the secondary battery 140 instead. The secondary battery 140 is connected to the DC/DC converter 134 included in the PCU 130 via a low pressure direct current wiring DCL, and connected to the high pressure direct current wiring DCH via the DC/DC converter 134.

The SOC detection unit 142 detects the SOC of the secondary battery 140, and transmits the detected SOC to the control device 180. The SOC detection unit 142 detects a temperature T, an output voltage V, and an output current I of the secondary battery 140, and detects the SOC on a basis of these detection values. The accelerator position detection unit 175 serves as an accelerator operation amount detection unit so as to detect, as an accelerator operation amount, an amount by which a driver depresses an accelerator pedal (an accelerator depression amount $D_{ACC}$) (%), and transmits the detected accelerator depression amount $D_{ACC}$ to the control device 180. Note that the fuel cell vehicle 10 may also include auxiliary devices used during power generation by the fuel cell 110, such as a fuel pump and a coolant pump, and an air-conditioning device such as an air-conditioner.

The control device 180 is constituted by a microcomputer having a central processing unit and a main storage device. The control device 180 may be an electronic control unit (ECU). When an operation performed by the driver such as an accelerator operation is detected, the control device 180 controls power generation by the fuel cell 110 and charging/discharging of the secondary battery 140 in accordance with the content of the operation. The control device 180 generates a drive signal corresponding to the accelerator depression amount $D_{ACC}$, and transmits the generated drive signal to each of the motor driver 132 and the DC/DC converter 134. In response to the drive signal from the control device 180, the motor driver 132 drives the traction motor 136 to rotate in accordance with the accelerator depression amount $D_{ACC}$ by adjusting a pulse width of an alternating current voltage and so on.

The control device 180 calculates a required torque $T_{RQ}$ (N×m) from the accelerator depression amount $D_{ACC}$ detected by the accelerator position detection unit 175 and the vehicle speed $S_{VHCL}$ detected by the vehicle speed detection unit 139. The required torque $T_{RQ}$ is an amount of torque (a target torque) required by the traction motor 136, and can be calculated using a map that shows relationships between the accelerator depression amount $D_{ACC}$, the vehicle speed $S_{VHCL}$, and the required torque $T_{RQ}$. Further, the control device 180 controls the traction motor 136 such that a torque (an effective torque) $T_{AC}$ (N×m) actually generated by the traction motor 136 approaches the calculated required torque $T_{RQ}$. Here, the effective torque $T_{AC}$ is a torque (Tp) of a propeller shaft. At this time, the control device 180 executes acceleration management control to control an increase rate of the effective torque $T_{AC}$. The increase rate of the effective torque $T_{AC}$ will be referred to here as a Tp rate $RA_{Tp}$. The Tp rate $RA_{Tp}$ is an amount by which the effective torque $T_{AC}$ increases per calculation period of the control device 180. During the acceleration management control, the control device 180 calculates the Tp rate $RA_{Tp}$ from the accelerator depression amount $D_{ACC}$ and the vehicle speed $S_{VHCL}$, and controls the effective torque $T_{AC}$ of the traction motor 136 to the calculated Tp rate $RA_{Tp}$. The Tp rate $RA_{Tp}$ according to this embodiment functions as a torque increase rate.

Figure 2:
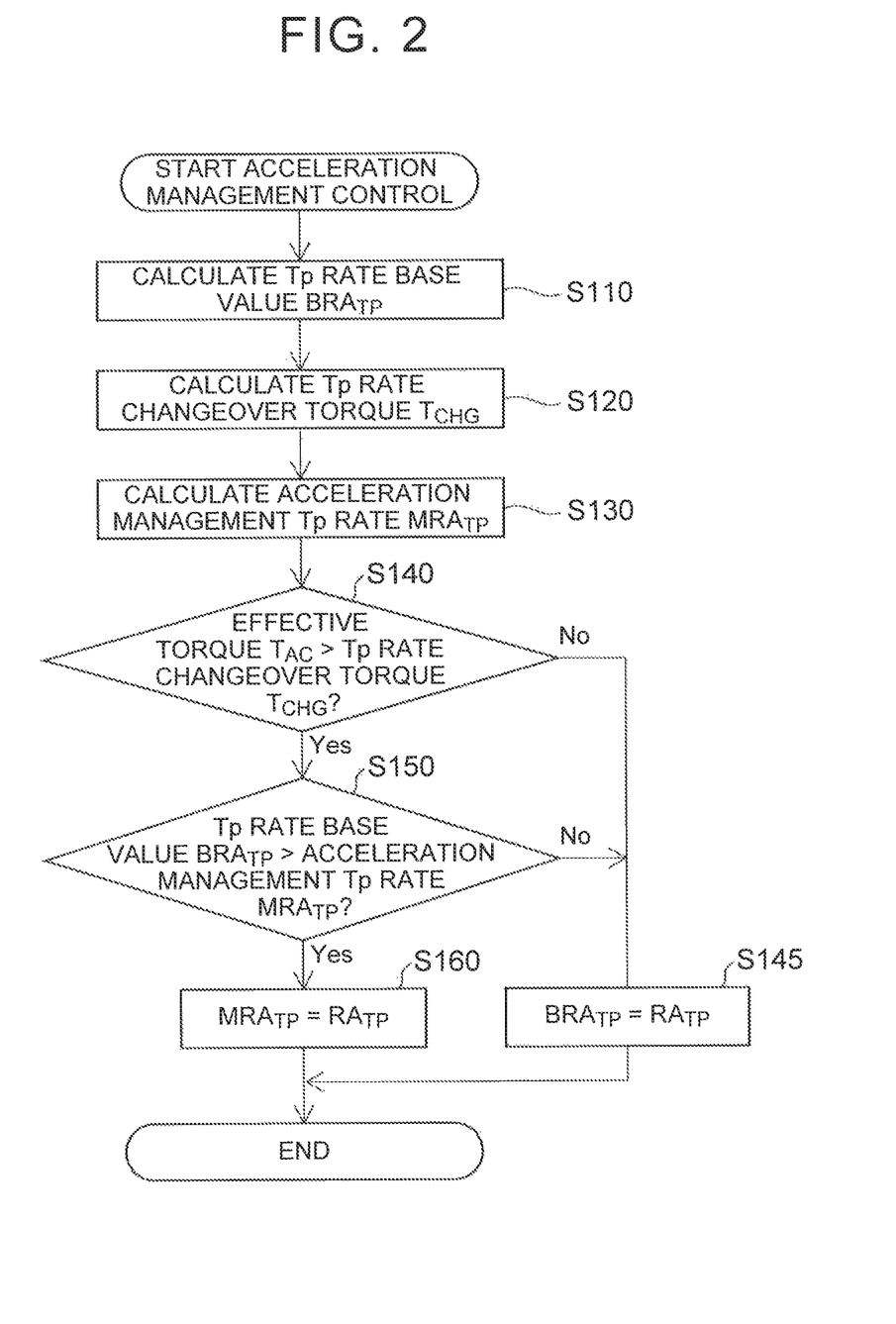
FIG. 2 is a flowchart illustrating acceleration management control.

FIG. 2 is a flowchart illustrating the acceleration management control. The control device 180 executes the acceleration management control described below repeatedly at predetermined period intervals when the driver switches an ignition ON. First, the control device 180 calculates a Tp rate base value $BRA_{Tp}$ that serves as a base value when calculating the Tp rate $RA_{Tp}$ (step S110). The Tp rate base value $BRA_{Tp}$ can be calculated from Equation (1), shown below.

$$BRA_{Tp}=T_{DIF}+T_{OFST}+T_{RTH} \quad (1)$$

Here, $T_{DIF}$ is a difference ($T_{RQ}-T_{AC}$) between the required torque $T_{RQ}$ and the effective torque $T_{AC}$. $T_{OFST}$ is a value (>0) set in advance as an offset value of $RA_{Tp}$. $T_{RTH}$ is a value (≤0) set in advance in accordance with the value of the effective torque $T_{AC}$ in order to suppress gear rattle occurring when the effective torque $T_{AC}$ shifts from a negative value to a positive value. Here, $T_{RTH}$ takes a negative value when the effective torque $T_{AC}$ is within a predetermined range close to zero, and takes a value of zero when the value of the effective torque $T_{AC}$ is not within the predetermined range.

Next, the control device 180 calculates a Tp rate changeover torque $T_{CHG}$, which is a threshold of the effective torque $T_{AC}$ used to calculate the Tp rate $RA_{Tp}$ (step S120). The control device 180 includes a map (an $S_{VHCL}$-$T_{CHG}$ map) showing a correspondence relationship between the vehicle speed $S_{VHCL}$ and the Tp rate changeover torque $T_{CHG}$, and calculates the Tp rate changeover torque $T_{CHG}$ from the vehicle speed $S_{VHCL}$ and the $S_{VHCL}$-$T_{CHG}$ map. The $S_{VHCL}$-$T_{CHG}$ map is set such that the Tp rate changeover torque $T_{CHG}$ increases steadily as the vehicle speed $S_{VHCL}$ increases. In other words, the control device 180 switches the Tp rate changeover torque $T_{CHG}$ as the vehicle speed $S_{VHCL}$ increases. Note that the $S_{VHCL}$-$T_{CHG}$ map may be set such that a value of the Tp rate changeover torque $T_{CHG}$ when the vehicle speed $S_{VHCL}$ is relatively high equals or exceeds the value of the Tp rate changeover torque $T_{CHG}$ when the vehicle speed $S_{VHCL}$ is relatively low. In other words, a region in which the Tp rate changeover torque $T_{CHG}$ does not vary even when the vehicle speed $S_{VHCL}$ increases may exist on the $S_{VHCL}$-$T_{CHG}$ map. For example, the value of the Tp rate changeover torque $T_{CHG}$ may be set on the $S_{VHCL}$-$T_{CHG}$ map in respective speed ranges (0 to 10, 10 to 20, . . . (km/h), for example) corresponding to the vehicle speed $S_{VHCL}$. The Tp rate changeover torque $T_{CHG}$ according to this embodiment functions as a threshold torque. The $S_{VHCL}$-$T_{CHG}$ map functions as a second map.

Next, the control device 180 calculates an acceleration management Tp rate $MRA_{Tp}$ that is used as an upper limit value of the Tp rate $RA_{Tp}$ (step S130). The control device 180 includes a map (an acceleration management Tp rate map) that shows correspondence relationships between the accelerator depression amount $D_{ACC}$, the vehicle speed $S_{VHCL}$, and the acceleration management Tp rate $MRA_{Tp}$, and calculates the acceleration management Tp rate $MRA_{Tp}$ from the accelerator depression amount $D_{ACC}$, the vehicle speed $S_{VHCL}$, and the acceleration management Tp rate map. A specific configuration of the acceleration management Tp rate map will be described below. The acceleration management Tp rate $MRA_{Tp}$ according to this embodiment functions as an upper limit value of the torque increase rate. The acceleration management Tp rate map functions as a first map.

The control device 180 determines whether or not the effective torque $T_{AC}$ exceeds the Tp rate changeover torque $T_{CHG}$ (step S140). When the effective torque $T_{AC}$ does not exceed the Tp rate changeover torque $T_{CHG}$ ($T_{AC} \leq T_{CHG}$) the control device 180 calculates the value of the Tp rate base value $BRA_{Tp}$ as the Tp rate $RA_{Tp}$ (step S145). The control device 180 then controls the effective torque $T_{AC}$ of the traction motor 136 to the calculated Tp rate $RA_{Tp}$.

When the effective torque $T_{AC}$ exceeds the Tp rate changeover torque $T_{CHG}$ ($T_{AC} > T_{CHG}$), on the other hand, the control device 180 determines whether or not the Tp rate base value $BRA_{Tp}$ exceeds the acceleration management Tp rate $MRA_{Tp}$ (step S150). When the Tp rate base value $BRA_{Tp}$ does not exceed the acceleration management Tp rate $MRA_{Tp}$ ($BRA_{Tp} \leq MRA_{Tp}$), the control device 180 calculates the value of the Tp rate base value $BRA_{Tp}$ as the Tp rate $RA_{Tp}$ (step S145). The control device 180 then controls the effective torque $T_{AC}$ of the traction motor 136 to the calculated Tp rate $RA_{Tp}$.

When the Tp rate base value $BRA_{Tp}$ exceeds the acceleration management Tp rate $MRA_{Tp}$ ($BRA_{Tp} > MRA_{Tp}$), on the other hand, the control device 180 calculates the value of the acceleration management Tp rate $MRA_{Tp}$ as the Tp rate $RA_{Tp}$ (step S160). Here, the acceleration management Tp rate $MRA_{Tp}$ functions as an upper limit value (a guard value) of the Tp rate base value $BRA_{Tp}$. Note that in order to suppress rapid reduction in the calculated Tp rate $RA_{Tp}$, the control device 180 may calculate the Tp rate $RA_{Tp}$ in step S160 by performing rate processing (smoothing processing) on a decrease rate of the Tp rate $RA_{Tp}$ so that the decrease rate of the Tp rate $RA_{Tp}$ does not equal or exceed a predetermined rate. In other words, the Tp rate $RA_{Tp}$ may be calculated so that a difference between the Tp rate base value $BRA_{Tp}$ and the acceleration management Tp rate $MRA_{Tp}$ decreases gradually. In so doing, torque shock can be suppressed.

Hence, when the effective torque $T_{AC}$ does not exceed the Tp rate changeover torque $T_{CHG}$ during the acceleration management control, the control device 180 calculates the value of the Tp rate base value $BRA_{Tp}$ as the Tp rate $RA_{Tp}$ regardless of whether or not the value of the Tp rate base value $BRA_{Tp}$ exceeds the acceleration management Tp rate $MRA_{Tp}$. As a result, the effective torque $T_{AC}$ can be brought close to the required torque $T_{RQ}$ quickly, thereby suppressing a sensation of sluggishness in the vehicle when the accelerator pedal is depressed. When the effective torque $T_{AC}$ exceeds the Tp rate changeover torque $T_{CHG}$, on the other hand, the control device 180 reduces the Tp rate $RA_{Tp}$ to the acceleration management Tp rate $MRA_{Tp}$. As a result, a sensation of the vehicle shooting forward against the will of the driver when the accelerator pedal is depressed can be suppressed.

Figure 3A:
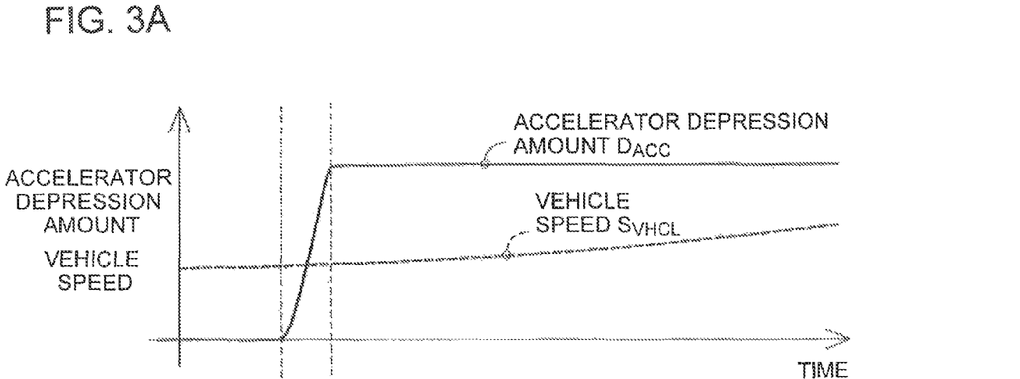
FIGS. 3A to 3C are timing charts showing example conditions of the fuel cell vehicle.
Figure 3B:
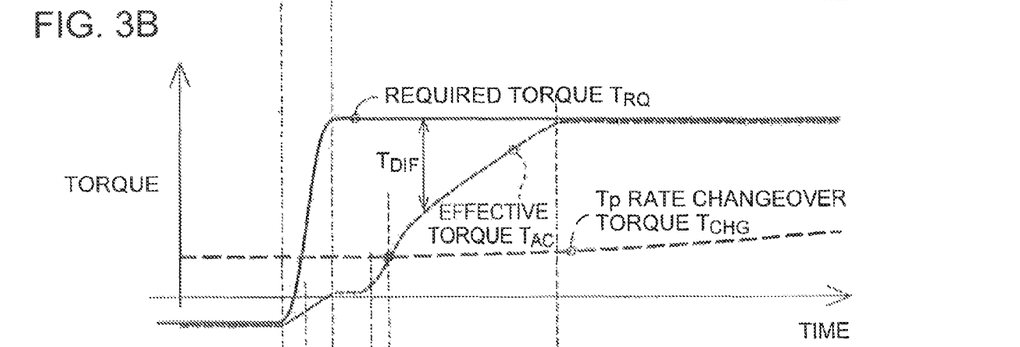
Figure 3C:
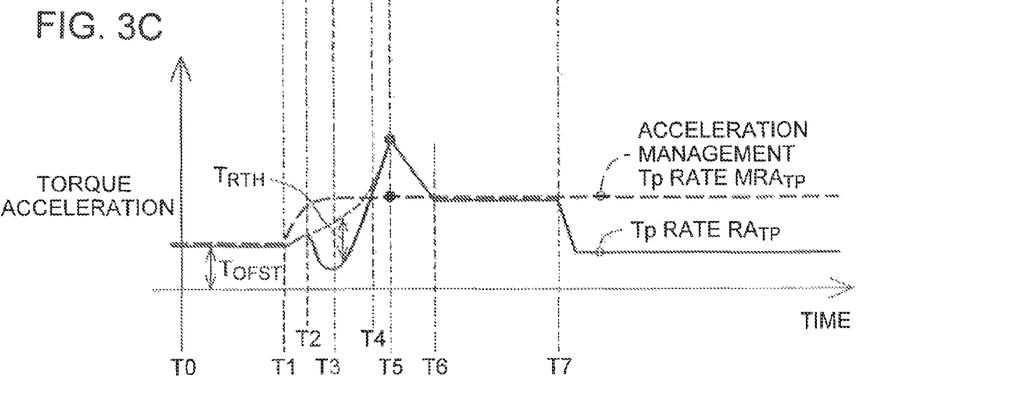

FIGS. 3A to 3C are timing charts showing example conditions of the fuel cell vehicle 10 according to this embodiment. FIG. 3A shows time series variation in the accelerator depression amount $D_{ACC}$ and the vehicle speed $S_{VHCL}$. FIG. 3B shows time series variation in the required torque $T_{RQ}$, the effective torque $T_{AC}$, and the Tp rate changeover torque $T_{CHG}$. FIG. 3C shows time series variation in the Tp rate $RA_{Tp}$ and the acceleration management Tp rate $MRA_{Tp}$. In the case described below, the driver does not depress the accelerator during a period from T0 to T1, depression of the accelerator starts at the time T1, and from a time T3 onward, the accelerator depression amount remains constant. Further, in the case described below, variation in the vehicle speed $S_{VHCL}$ is small, and therefore the value of the Tp rate changeover torque $T_{CHG}$ is not switched. Furthermore, in the case described below, $T_{RTH}$ of Equation (1) takes a negative value when the Tp rate $RA_{Tp}$ is calculated during a period from T2 to T4.

During the period from T0 to T1, the accelerator depression amount $D_{ACC}$ is zero, and therefore the control device 180 calculates the required torque $T_{RQ}$ as a negative value. Accordingly, negative acceleration is generated in the fuel cell vehicle 10. Further, since substantially no variation occurs in either the accelerator depression amount $D_{ACC}$ or the vehicle speed $S_{VHCL}$, the control device 180 calculates the acceleration management Tp rate $MRA_{Tp}$ as a substantially constant value. Since $T_{DIF}$ and $T_{RTH}$ of Equation (1) are both zero, the control device 180 calculates the value of $T_{OFST}$ as the Tp rate $RA_{Tp}$, but since the effective torque $T_{AC}$ is already equal to the required torque $T_{RQ}$ serving as the upper limit value, the control device 180 does not increase the effective torque $T_{AC}$ on a basis of the Tp rate $RA_{Tp}$.

During a period from T1 to T3, the accelerator depression amount $D_{ACC}$ increases rapidly, and therefore the control device 180 rapidly increases the calculated required torque $T_{RQ}$ and acceleration management Tp rate $MRA_{Tp}$. The effective torque $T_{AC}$ increases at a delay relative to the required torque $T_{RQ}$, and therefore the difference ($T_{RQ}-T_{AC}$) between the required torque $T_{RQ}$ and the effective torque $T_{AC}$ increases. From the time T3 onward, substantially no variation occurs in either the accelerator depression amount $D_{ACC}$ or the vehicle speed $S_{VHCL}$, and therefore the control device 180 calculates the respective values of the required torque $T_{RQ}$ and the acceleration management Tp rate $MRA_{Tp}$ to be constant. During a period from T3 to T7, the effective torque $T_{AC}$ gradually approaches the required torque $T_{RQ}$, and at the time T7, the effective torque $T_{AC}$ becomes equal to the required torque $T_{RQ}$.

During the period from T1 to T2, $T_{DIF}$ of Equation (1) increases while $T_{RTH}$ remains at zero, and therefore the control device 180 increases the calculated Tp rate $RA_{Tp}$ and increases the effective torque $T_{AC}$ to correspond to the Tp rate $RA_{Tp}$. During a period from T2 to T4, $T_{DIF}$ of Equation (1) increases while $T_{RTH}$ falls greatly below zero, and therefore the control device 180 reduces the calculated Tp rate $RA_{Tp}$ and causes the effective torque $T_{AC}$ to rise less sharply. At the time T4, $T_{RTH}$ of Equation (1) returns to zero, and therefore the control device 180 increases the calculated Tp rate $RA_{Tp}$ and increases the effective torque $T_{AC}$ to correspond to the Tp rate $RA_{Tp}$. Note that at the time T4, the effective torque $T_{AC}$ does not yet exceed the Tp rate changeover torque $T_{CHG}$ (step S140 in FIG. 2: No), and therefore the value of the Tp rate $RA_{Tp}$ may exceed the acceleration management Tp rate $MRA_{Tp}$. Hence, the increase rate of the effective torque $T_{AC}$ can be kept high, enabling an improvement in an acceleration feeling of the vehicle.

When the effective torque $T_{AC}$ exceeds the Tp rate changeover torque $T_{CHG}$ (step S140 in FIG. 2: Yes) and the Tp rate $RA_{Tp}$ exceeds the acceleration management Tp rate $MRA_{Tp}$ (step S150 in FIG. 2: Yes), as occurs at a time T5, the control device 180 reduces the value of the Tp rate $MRA_{Tp}$ to the acceleration management Tp rate $MRA_{Tp}$ serving as the upper limit value (step S160 in FIG. 2). Here, the control device 180 calculates the Tp rate $RA_{Tp}$ by performing rate processing (smoothing processing) on the decrease rate of the Tp rate $RA_{Tp}$, and therefore the calculated Tp rate $RA_{Tp}$ takes a larger value than the acceleration management Tp rate $MRA_{Tp}$. In a period from T5 to T6, the control device 180 reduces the value of the calculated Tp rate $RA_{Tp}$ such that at the time T6, the value of the Tp rate $RA_{Tp}$ becomes equal to the acceleration management Tp rate $MRA_{Tp}$. Hence, when the effective torque $T_{AC}$ exceeds the Tp rate changeover torque $T_{CHG}$, the control device 180 reduces the increase rate of the effective torque $T_{AC}$ (the Tp rate $RA_{Tp}$) to the set upper limit value (the acceleration management Tp rate $MRA_{Tp}$). As a result, the sensation of the vehicle shooting forward against the will of the driver when the accelerator pedal is depressed can be suppressed. Note that at the time T7, $T_{DIF}$ of Equation (1) reaches zero, and therefore the control device 180 reduces the calculated Tp rate $RA_{Tp}$.

Figure 4:
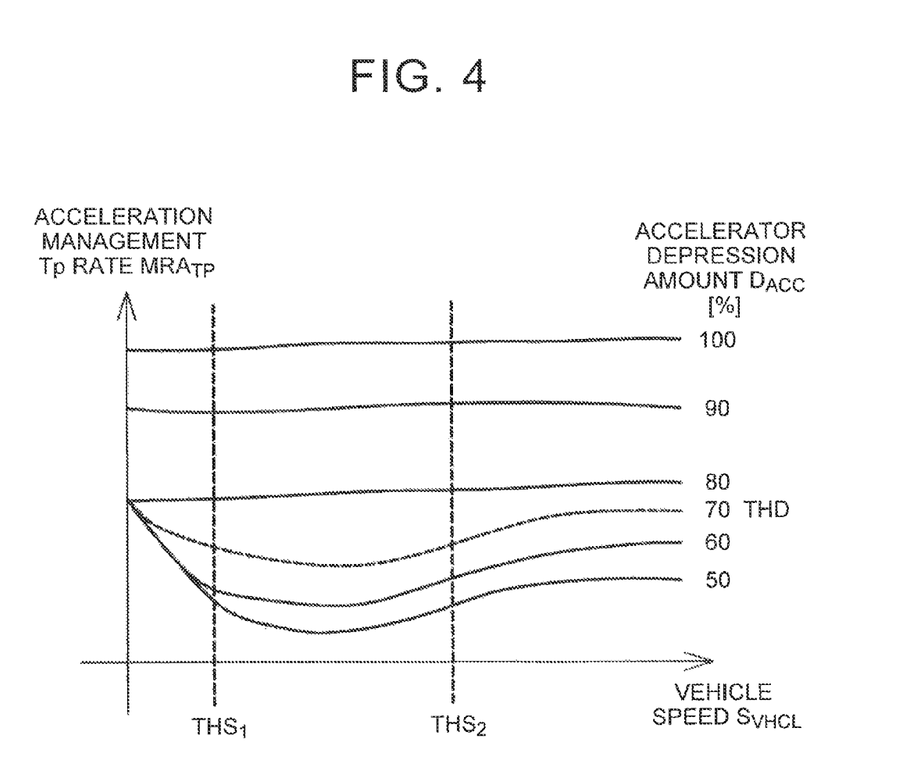
FIG. 4 is a view illustrating an acceleration management Tp rate map.

FIG. 4 is a view illustrating the acceleration management Tp rate map. FIG. 4 shows a relationship between the vehicle speed $S_{VHCL}$ and the acceleration management Tp rate $MRA_{Tp}$ at each accelerator depression amount $D_{ACC}$. The control device 180 includes the acceleration management Tp rate map shown in FIG. 4, and calculates the acceleration management Tp rate $MRA_{Tp}$ from the accelerator depression amount $D_{ACC}$, the vehicle speed $S_{VHCL}$, and the acceleration management Tp rate map. In the fuel cell vehicle 10 according to this embodiment, the acceleration management Tp rate $MRA_{Tp}$ corresponding to the accelerator depression amount $D_{ACC}$ and the vehicle speed $S_{VHCL}$ can be set easily using the acceleration management Tp rate map. Accordingly, the acceleration management Tp rate $MRA_{Tp}$ at which the driver feels most comfortable can be set easily for each vehicle speed $S_{VHCL}$ and each accelerator depression amount $D_{ACC}$, and as a result, an improvement in drivability can be achieved.

On the acceleration management Tp rate map, the acceleration management Tp rate $MRA_{Tp}$ is set to increase in value steadily as the accelerator depression amount $D_{ACC}$ increases. Accordingly, deterioration of the acceleration feeling relative to the accelerator depression amount $D_{ACC}$ when the accelerator pedal is depressed by a large amount can be suppressed. Note that the acceleration management Tp rate map may be set such that the acceleration management Tp rate $MRA_{Tp}$ when the accelerator depression amount $D_{ACC}$ is relatively large equals or exceeds the acceleration management Tp rate $MRA_{Tp}$ when the accelerator depression amount $D_{ACC}$ is relatively small. In other words, a region in which the acceleration management Tp rate $MRA_{Tp}$ does not vary even when the vehicle speed $S_{VHCL}$ increases may exist on the acceleration management Tp rate map.

Further, on the acceleration management Tp rate map, while the accelerator depression amount $D_{ACC}$ is at or below a threshold depression amount THD serving as a threshold operation amount, the acceleration management Tp rate $MRA_{Tp}$ when the vehicle speed $S_{VHCL}$ is no lower than a first threshold vehicle speed $THS_1$ and no higher than a second threshold vehicle speed $THS_2$ is set to be relatively smaller than the acceleration management Tp rate $MRA_{Tp}$ when the vehicle speed $S_{VHCL}$ is lower than the first threshold vehicle speed $THS_1$ and higher than the second threshold vehicle speed $THS_2$. The threshold depression amount THD, the first threshold vehicle speed $THS_1$, and the second threshold vehicle speed $THS_2$ are set at appropriate values at which the driver is most comfortable. For example, the threshold depression amount THD may be approximately 60 to 80%, the first threshold vehicle speed $THS_1$ may be approximately 20 to 40 km/h, and the second threshold vehicle speed $THS_2$ may be approximately 60 to 80 km/h. Hence, the acceleration management Tp rate $MRA_{Tp}$ when the accelerator pedal is initially depressed from a stationary condition is relatively high, and therefore a sufficient torque response can be secured when the accelerator pedal is initially depressed from a stationary condition, whereby a sensation of sluggishness upon initial depression of the accelerator pedal can be suppressed. On the other hand, the acceleration management Tp rate $MRA_{Tp}$ at a low vehicle speed and a small accelerator depression amount is relatively low, and therefore the sensation of the vehicle shooting forward against the will of the driver can be suppressed. Moreover, the acceleration management Tp rate $MRA_{Tp}$ at a high vehicle speed is relatively high, and therefore deterioration of the acceleration feeling relative to the accelerator depression amount $D_{ACC}$ upon depression of the accelerator pedal can be suppressed.

The fuel cell vehicle 10 according to this embodiment, described above, is configured to operate at a predetermined Tp rate $RA_{Tp}$ until the effective torque $T_{AC}$ reaches the Tp rate changeover torque $T_{CHG}$, and such that the Tp rate $RA_{Tp}$ is reduced after the effective torque $T_{AC}$ reaches the Tp rate changeover torque $T_{CHG}$. According to this configuration, a sufficient torque response can be secured when the accelerator pedal is initially depressed from a stationary condition, for example, whereby the sensation of sluggishness upon initial depression of the accelerator pedal can be suppressed. When the effective torque exceeds the threshold torque, on the other hand, the torque increase rate is reduced, and therefore the sensation of the vehicle shooting forward against the will of the driver can be suppressed.

Further, the fuel cell vehicle 10 according to this embodiment includes the acceleration management Tp rate map, and therefore the acceleration management Tp rate $MRA_{Tp}$ corresponding to the accelerator depression amount $D_{ACC}$ and the vehicle speed $S_{VHCL}$ can be set easily. Hence, the acceleration management Tp rate $MRA_{Tp}$ at which the driver feels most comfortable can be set easily for each vehicle speed $S_{VHCL}$ and each accelerator depression amount $D_{ACC}$. For example, by making the acceleration management Tp rate $MRA_{Tp}$ at a low vehicle speed and a small accelerator depression amount relatively low, the sensation of the vehicle shooting forward against the will of the driver when the accelerator pedal is depressed at a low speed can be suppressed. Furthermore, for example, by increasing the acceleration management Tp rate $MRA_{Tp}$ steadily as the accelerator depression amount $D_{ACC}$ increases, deterioration of the acceleration feeling relative to the accelerator depression amount $D_{ACC}$ when the accelerator pedal is depressed by a large amount can be suppressed.

Moreover, the fuel cell vehicle 10 according to this embodiment includes the $S_{VHCL}$-$T_{CHG}$ map, and therefore the Tp rate $RA_{Tp}$ can exceed the acceleration management Tp rate $MRA_{Tp}$ at each vehicle speed until the effective torque $T_{AC}$ reaches the Tp rate changeover torque $T_{CHG}$, enabling an improvement in the acceleration feeling of the vehicle. As a result, a sufficient torque response is secured when the accelerator is initially depressed from a stationary condition, for example, whereby the sensation of sluggishness upon initial depression of the accelerator pedal can be suppressed. When the effective torque $T_{AC}$ exceeds the Tp rate changeover torque $T_{CHG}$, on the other hand, the Tp rate $RA_{Tp}$ is reduced to the Tp rate changeover torque $T_{CHG}$, and therefore the sensation of the vehicle shooting forward against the will of the driver can be suppressed.

Note that the invention is not limited to the embodiment described above, and may be implemented in various other embodiments within a scope that does not depart from the spirit thereof. For example, following amendments may be implemented.

In this embodiment, the invention is realized as the fuel cell vehicle 10, but the invention may be applied to a vehicle not having a fuel cell. For example, the invention may be applied to an electric vehicle or a hybrid vehicle.

In this embodiment, the Tp rate changeover torque $T_{CHG}$ is described as being calculated from the vehicle speed $S_{VHCL}$ and the $S_{VHCL}$-$T_{CHG}$ map, but the Tp rate changeover torque $T_{CHG}$ may take a single fixed value. In this case, the fuel cell vehicle 10 need not include the $S_{VHCL}$-$T_{CHG}$ map.

The acceleration management Tp rate map is not limited to the content described above. For example, the acceleration management Tp rate map need not be set such that while the accelerator depression amount $D_{ACC}$ is at or below the threshold depression amount THD, the acceleration management Tp rate $MRA_{Tp}$ when the vehicle speed $S_{VHCL}$ is no lower than the first threshold vehicle speed $THS_1$ and no higher than the second threshold vehicle speed $THS_2$ decreases relative to the acceleration management Tp rate $MRA_{Tp}$ when the vehicle speed $S_{VHCL}$ is lower than the first threshold vehicle speed $THS_1$ and higher than the second threshold vehicle speed $THS_2$ as the accelerator depression amount $D_{ACC}$ increases. Likewise in this case, other acceleration management Tp rates $MRA_{Tp}$ at which the driver feels most comfortable can be set easily in accordance with the vehicle speed $S_{VHCL}$, and the accelerator depression amount $D_{ACC}$.

Note that the invention may be realized in various forms, for example as a fuel cell vehicle, a hybrid vehicle, an electric vehicle, a control method for a vehicle driven by an electric motor, a control apparatus for executing the control method, a computer program for realizing the control method, a recording medium on which the computer program is recorded, and so on.

What is claimed is:

1. A vehicle driven by an electric motor, comprising:
  an accelerator operation amount detection unit that detects an accelerator operation amount of the vehicle;
  a speed detection unit that detects a vehicle speed of the vehicle; and
  a control unit configured to calculate a required torque of the electric motor on a basis of the accelerator operation amount and the vehicle speed, calculate a torque increase rate, which is a required rate at which an effective torque for driving the electric motor is increased, on a basis of the required torque, and control the electric motor on a basis of the calculated torque increase rate, wherein
  the control unit is configured to control the electric motor to operate at a predetermined torque increase rate until the effective torque reaches a predetermined threshold torque, and to reduce the torque increase rate below the predetermined torque increase rate after the effective torque reaches the predetermined threshold torque,
  the control unit includes a first map showing a correspondence relationship between the accelerator operation amount, the vehicle speed, and an upper limit value of the torque increase rate, and
  the control unit is configured to control the electric motor such that, when the effective torque exceeds the threshold torque and the torque increase rate exceeds the upper limit value, the torque increase rate is reduced to the upper limit value.

2. The vehicle according to claim 1, wherein
  the control unit includes a second map showing a correspondence relationship between the vehicle speed and the threshold torque, and
  the second map is set such that a value of the threshold torque when the vehicle speed is relatively high equals or exceeds a value of the threshold torque when the vehicle speed is relatively low.

3. The vehicle according to claim 1, wherein the first map is set such that the upper limit value when the accelerator operation amount is relatively large equals or exceeds the upper limit value when the accelerator operation amount is relatively small.

4. The vehicle according to claim 1, wherein the first map is set such that while the accelerator operation amount is equal to or smaller than a threshold operation amount, the upper limit value when the vehicle speed is no lower than a first threshold vehicle speed and no higher than a second threshold vehicle speed is smaller than the upper limit value when the vehicle speed is lower than the first threshold vehicle speed and higher than the second threshold vehicle speed.

5. A control method for a vehicle that is driven by an electric motor, comprising:
  detecting an accelerator operation amount and a vehicle speed of the vehicle;
  calculating a required torque of the electric motor on a basis of the accelerator operation amount and the vehicle speed;
  calculating a torque increase rate, which is a required rate at which an effective torque for driving the electric motor is increased, on a basis of the required torque; and
  controlling the electric motor on a basis of the calculated torque increase rate, wherein the electric motor is controlled to operate at a predetermined torque increase rate until the effective torque reaches a predetermined threshold torque, and the electric motor is controlled such that the torque increase rate is reduced below the predetermined torque increase rate after the effective torque reaches the predetermined threshold torque, wherein
  the electric motor is controlled by a control unit including a first map showing a correspondence relationship between the accelerator operation amount, the vehicle speed, and an upper limit value of the torque increase rate, and
  the electric motor is controlled such that, when the effective torque exceeds the threshold torque and the torque increase rate exceeds the upper limit value, the torque increase rate is reduced to the upper limit value.

* * * * *